US008384986B2

(12) United States Patent
Sacher

(10) Patent No.: US 8,384,986 B2
(45) Date of Patent: Feb. 26, 2013

(54) IMAGE AREA OR DISPLAY

(75) Inventor: Friedrich-Josef Sacher, Troisdorf (DE)

(73) Assignee: ASPRE AG, Appenzell (CH)

( * ) Notice: Subject to any disclaimer, the term of this patent is extended or adjusted under 35 U.S.C. 154(b) by 537 days.

(21) Appl. No.: 12/224,532

(22) PCT Filed: Feb. 21, 2007

(86) PCT No.: PCT/EP2007/001470
§ 371 (c)(1),
(2), (4) Date: Jun. 14, 2010

(87) PCT Pub. No.: WO2007/098875
PCT Pub. Date: Sep. 7, 2007

(65) Prior Publication Data

US 2010/0253993 A1 Oct. 7, 2010

(30) Foreign Application Priority Data

Feb. 28, 2006 (DE) ......................... 10 2006 009 541

(51) Int. Cl.
*G02B 26/00* (2006.01)
(52) U.S. Cl. ....................................................... 359/296
(58) Field of Classification Search .................. 359/228, 359/240, 245, 253, 296, 297; 345/84, 107
See application file for complete search history.

(56) References Cited

U.S. PATENT DOCUMENTS 6,037,955 A * 3/2000 DeBoer et al. ............. 346/140.1
6,512,626 B1 1/2003 Schmidt
7,834,845 B2 * 11/2010 Sacher .......................... 345/107

FOREIGN PATENT DOCUMENTS

EP 1014141 6/2000
WO WO0000947 1/2000
WO WO2004021318 3/2004

* cited by examiner

*Primary Examiner* — Tuyen Tra
(74) *Attorney, Agent, or Firm* — Muirhead and Saturnelli, LLC

(57) ABSTRACT

An image area is described comprising numerous pixels arranged in a raster-like manner which have at least three color levels which are formed by flat transparent chambers. These chambers of the color levels are each connected to a reservoir whose content is electronically movable in such a way that colored fluid flows from the reservoir into the color level or from the color level into the reservoir. For visual and manufacturing-related reasons, the pixels and their color levels in the image plane have substantially the shape of an isosceles triangle and the channels for the supply of the colored fluids are flat and situated on the three different sides of the pixel.

9 Claims, 2 Drawing Sheets

IMAGE AREA OR DISPLAY

TECHNICAL FIELD

The system described herein relates to an image area comprising numerous pixels arranged in a raster-like manner, each pixel having at least one color level formed by a flat transparent chamber into which a colored fluid may be introduced. A pixel is the smallest image element of an image area to which color and intensity may be assigned. A pixel may have three or four color levels arranged one above the other, to which the colors red, green, blue or the colors cyan, magenta, yellow may be supplied and, if necessary, a fourth rear color level to which the color white or black may be supplied.

BACKGROUND OF THE INVENTION

Images areas and pixels of this type are known from U.S. Pat. No. 6,037,955, EP 0 806 753 and EP 1 090 384.

The pixels and color levels of the known image areas or displays of this type have a rectangular shape, in particular a square shape in the image plane and are arranged side by side and one above the other without any distance between them, if possible.

With displays or image areas which may be viewed from a greater distance and in which the pixels may be larger for reasons of cost, there is the disadvantage with such rectangular or square pixels that an interfering grid is visible when the image area is viewed up close; this grid is made up of horizontal and vertical lines generated by the dividing walls of the chambers forming the color levels.

Accordingly, it would be desirable to create an image area in which the interfering grid is not as apparent or is not noticeable at all when viewed more closely. Furthermore, the producibility and the stability of the image area formed from several layers made up of transparent material and permeated by chambers and channels should be improved.

SUMMARY OF THE INVENTION

According to an embodiment of the system described herein, color levels of the pixels in the image plane have substantially the shape of an isosceles triangle, in particular the shape of an equilateral triangle, and supply channels for the three color levels of the pixel have a flat cross section and are situated on the three different sides of the triangular pixel.

As a result of this shape of the pixels, the pixels on the display do not form a rectangular raster-type arrangement but instead form an assembled area having intermeshing rows of pixels. This avoids the interfering grid structure on the display. The image is resolved by the eye of the viewer into individual pixels only at a much later point in time and may therefore be viewed in greater proximity.

This shape of the color levels and the pixels, however, not only has visual advantages but also has manufacturing-related advantages. In manufacturing an image area, made up of multiple transparent layers, which are comprises pixels and color levels arranged tightly without gaps and permeated by chambers, reservoirs, and channels, it is difficult to connect the color levels to the assigned reservoirs.

In particular when the image area is made up of pixels having three color levels one behind the other for the colors red, green, blue or the colors cyan, magenta, yellow, the supply channels for the three color levels of the pixel may have a flat cross section and may be arranged on the three different sides of the triangular pixel. Due to the fact that the supply channels for the three color levels of a pixel have a flat cross section and are situated on the three different sides of the triangular pixel, a better distribution of the supply channels and lower attenuation of the display are achieved.

The system described herein also relates to a color level, which is connected to a reservoir and is formed by a flat transparent chamber, a fluid stream being movable between the reservoir and the color level, which is made up of at least two nonmiscible fluids, of which one fluid may be clear transparent and the other fluid may be a colored fluid. For simplifying the construction and production, the color level may be connected to the reservoir via only one channel. Via this channel, the colored fluid is supplied to the color level or the reservoir and at the same time the clear transparent fluid is removed.

The channel may have a flat cross section and its width may be at least three times greater than its depth.

BRIEF DESCRIPTION OF THE DRAWING

Exemplary embodiments of the system described herein are explained below with reference to the accompanying drawings. In the drawings.

DETAILED DESCRIPTION OF VARIOUS EMBODIMENTS

Figure 1:
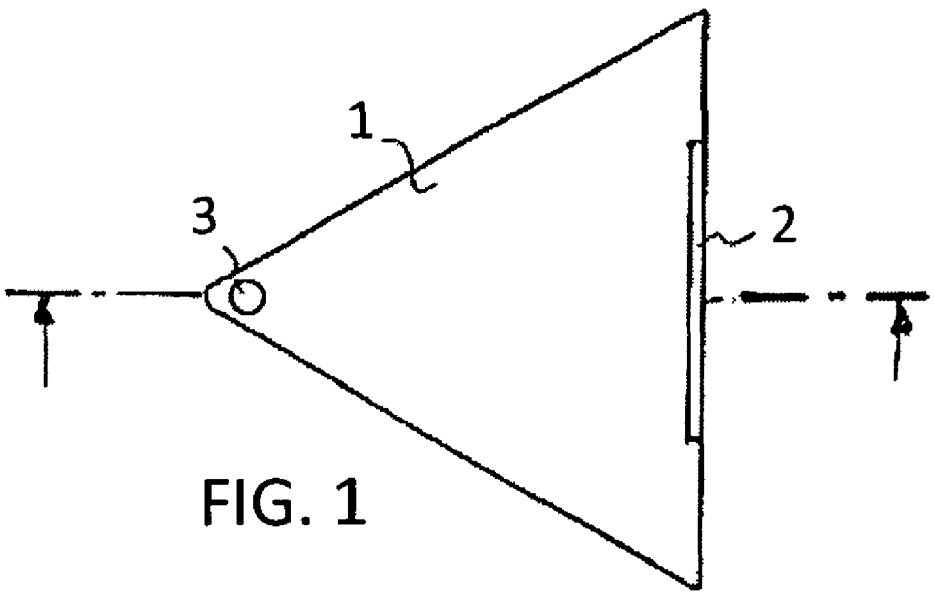
FIG. 1 shows a top view of a color level according to the system described herein.
Figure 2:
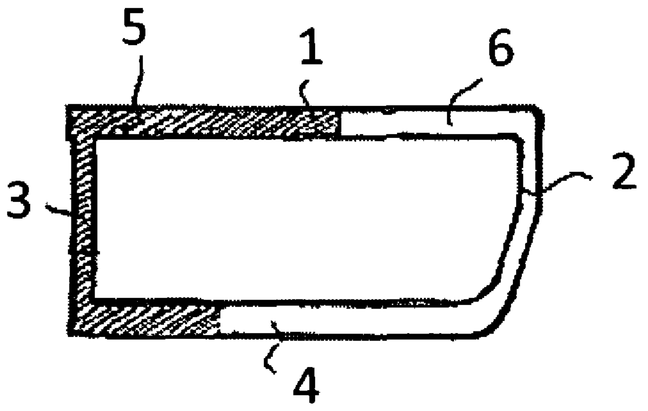
FIG. 2 shows a view according to sectional line II-II in FIG. 1.

Color level 1 of FIGS. 1 and 2 is connected via channels 2 and 3 to a reservoir 4. The color is supplied to and removed from color level 1 in a fluid stream, color level 1 being formed by a flat transparent chamber and the fluid stream being composed of a first colored section 5 and a second clear transparent section 6, the fluids of the first and second section not being miscible with one another and the fluid stream being moved between color level 1 and reservoir 4 by electrowetting or via a micropump.

Figure 3:
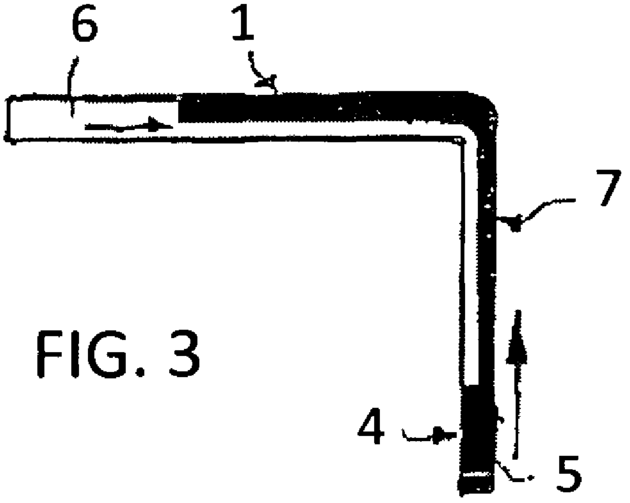
FIG. 3 shows a view according to FIG. 2 in which the chamber of the color level has only one channel for supplying and removing the colored fluid.

Color level 1 in FIG. 3 is connected to reservoir 4 by only one channel 7 through which colored fluid 5 may be supplied to color level 1 or to reservoir 4 and at the same time clear transparent fluid 6 may be removed.

Figure 4:
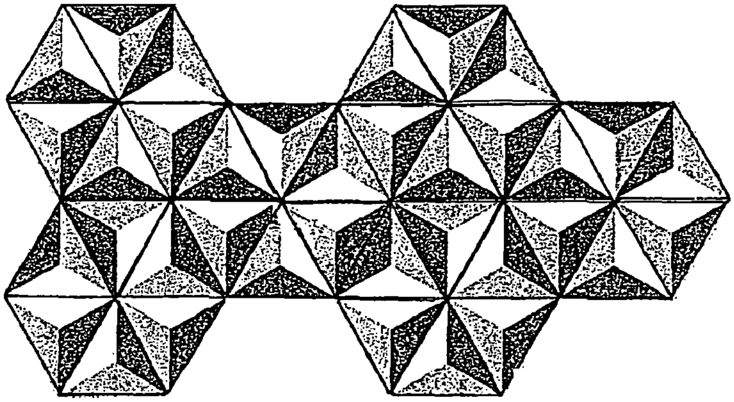
FIG. 4 shows a top view of a part of an image area, whose color levels have the shape of an isosceles triangle and which are filled with three different colors.
Figure 5:
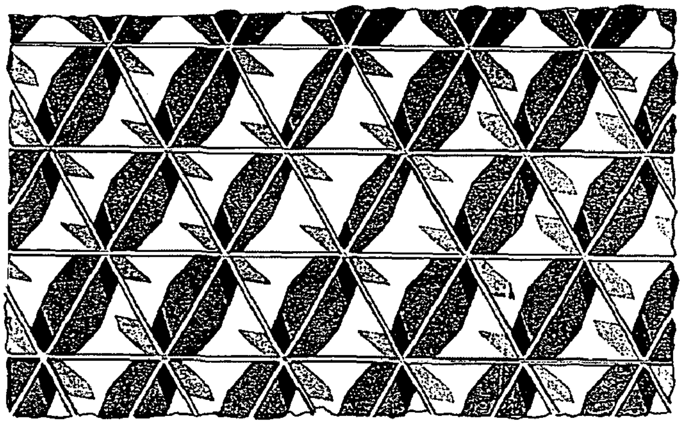
FIG. 5 shows a top view of a part of an image area, whose color levels have the shape of an equilateral triangle and which are partially filled with different colors.

FIGS. 4 and 5 show the raster-like arrangement of an image area in which the color levels have the shape of equilateral triangles and are partially filled with different colors. This shows that the dividing lines between the pixels are jagged and intermeshing. Even at small distances, the dividing lines flow together for the human eye and the viewer sees a homogeneous area with the colors imparted to the pixels by the predetermined level filling.

Figure 6:
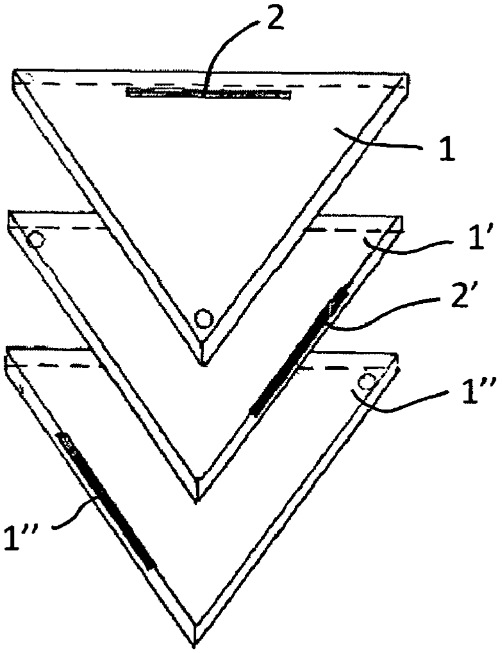
FIG. 6 shows a perspective view of a pixel made up of three color levels according to an embodiment of the system described herein.

FIG. 6 shows a perspective view of a pixel made up of three color levels 1, 1', and 1" which are depicted here at a distance from one another, but which in reality are arranged on top of each other without a distance. The supply channels 2, 2', and 2" which lead from the reservoirs to the color levels are flat in the area of the color levels and are situated on the three different sides of the pixel.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A display, comprising:

a plurality of electronically triggerable pixels arranged in a raster-like manner which have at least three color levels one behind the other for the colors red, green, blue or the colors cyan, magenta, yellow, wherein the at least three color levels are formed by flat transparent chambers and are each connected to a reservoir whose content can be moved via electronic triggering in such a way that colored fluid flows from the reservoirs into the color levels or out of the color levels into the reservoirs, wherein the color levels of the pixels in an image plane have substantially the shape of an isosceles triangle, and wherein supply channels for the three color levels of the pixel have a flat cross section and are situated on the three different sides of the triangular pixel, wherein a fluid stream is movable between the reservoir and the assigned color level with the aid of electrowetting, the fluid stream being made up of at least two nonmiscible fluids of which one fluid is clear transparent and the other fluid is colored fluid, wherein the color level is connected to the reservoir via only one channel via which the colored fluid is supplied to the color level or to the reservoir and via which the clear transparent fluid is simultaneously removed.

2. The display as recited in claim 1, wherein the color levels in the image plane have substantially the shape of an equilateral triangle.

3. The display as recited in claim 1, wherein the channel has a flat cross section and a width that is at least three times greater than a depth of the channel.

4. A display, comprising:

a plurality of pixels, wherein each of the pixels includes at least three color levels, wherein the at least three color levels are formed by transparent chambers and are each fluidly connected to a reservoir, wherein each of the color levels is substantially shaped as an isosceles triangle, and wherein supply channels for the at least three color levels are disposed on three different sides of each pixel, wherein a fluid stream is movable between the reservoir and a corresponding color level, the fluid stream including at least two nonmiscible fluids, wherein one of the nonmiscible fluids is clear transparent and at least one other of the nonmiscible fluids is a colored fluid, wherein the corresponding color level is connected to the reservoir via only one channel via which the colored fluid is supplied between the color level and the reservoir and via which the clear transparent fluid is removed.

5. The display as recited in claim 4, wherein the at least three color levels are substantially shaped as an equilateral triangle.

6. The display as recited in claim 4, wherein each of the supply channels has a width that is at least three times greater than a depth of the supply channel.

7. The display as recited in claim 4, wherein each of the color levels and each of the supply channels have a substantially flat cross section.

8. The display as recited in claim 4, wherein the at least three color levels include colors red, green and blue.

9. The display as recited in claim 4, wherein the at least three color levels include colors cyan, magenta, and yellow.

* * * * *